(12) United States Patent
Niitani et al.

(10) Patent No.: US 9,721,281 B2
(45) Date of Patent: Aug. 1, 2017

(54) COMPUTER-READABLE STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Ryusuke Niitani, Kyoto (JP);
Masahiro Shiotani, Kyoto (JP);
Toyokazu Nonaka, Kyoto (JP);
Takehiko Hosokawa, Kyoto (JP);
Kouichi Kawamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 457 days.

(21) Appl. No.: 13/927,752

(22) Filed: Jun. 26, 2013

(65) Prior Publication Data

US 2014/0325017 A1 Oct. 30, 2014

(30) Foreign Application Priority Data

Apr. 30, 2013 (JP) .................................. 2013-095514

(51) Int. Cl.
*G06F 15/16* (2006.01)
*G06Q 30/04* (2012.01)
(Continued)

(52) U.S. Cl.
CPC ......... *G06Q 30/04* (2013.01); *G06Q 30/0643* (2013.01); *H04L 29/08306* (2013.01); *H04L 67/104* (2013.01)

(58) Field of Classification Search
CPC .. A63F 13/12; H04L 29/08306; H04L 67/104
See application file for complete search history.

(56) References Cited

U.S. PATENT DOCUMENTS 8,832,278 B2   9/2014 Masuda et al.
9,298,407 B2 * 3/2016 Chang .................. G06F 3/1204
(Continued)

FOREIGN PATENT DOCUMENTS

JP          2011-309        1/2011
JP          2012-34325 A    2/2012

OTHER PUBLICATIONS

Office Action issued Jan. 31, 2017 in corresponding Japanese Application No. 2013-095514 with translation.

*Primary Examiner* — Krisna Lim
(74) *Attorney, Agent, or Firm* — Nixon & Vanderhye, P.C.

(57) ABSTRACT

An example computer-readable storage medium stores an information processing program, and this information processing program causes a computer of an information processing apparatus 10A to function as a close proximity communication unit 13 and an information processing unit 12. The close proximity communication unit 13 receives communication history data indicating a history of communication of application data by an information processing apparatus 10C by close proximity communication from the information processing apparatus 10C by close proximity communication. The information processing unit 12 performs predetermined information processing with the communication history data received by the close proximity communication unit 13 as a parameter.

12 Claims, 7 Drawing Sheets

(51) Int. Cl.
G06Q 30/06 (2012.01)
H04L 29/08 (2006.01)

(56) References Cited

U.S. PATENT DOCUMENTS

| | | | |
|---|---|---|---|
| 2002/0147819 A1* | 10/2002 | Miyakoshi | H04L 29/06 709/228 |
| 2006/0223635 A1* | 10/2006 | Rosenberg | A63F 13/10 463/37 |
| 2008/0076547 A1* | 3/2008 | Bigelow | G07F 17/3241 463/29 |
| 2010/0279776 A1* | 11/2010 | Hall | H04W 4/02 463/42 |
| 2010/0325235 A1 | 12/2010 | Konno et al. | |
| 2011/0131358 A1* | 6/2011 | Ganesh | G01C 21/265 710/304 |
| 2012/0021823 A1* | 1/2012 | Youm | 463/29 |
| 2012/0157210 A1* | 6/2012 | Hall | A63F 13/10 463/40 |
| 2013/0005480 A1* | 1/2013 | Bethke et al. | 463/42 |
| 2013/0072308 A1* | 3/2013 | Peck et al. | 463/42 |

* cited by examiner

COMPUTER-READABLE STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2013-095514, filed on Apr. 30, 2013, is incorporated herein by reference.

FIELD

The technology herein relates to an information processing apparatus capable of executing an application program, an information processing system including a plurality of information processing apparatuses, an information processing method, and a computer-readable storage medium having stored therein an information processing program.

BACKGROUND AND SUMMARY

There is known an information processing apparatus which is capable of executing an application program, and which exchanges predetermined communication data (typically, application data that can be used by an application program) with another information processing apparatus existing in close proximity, and performs information processing using the communication data received from the other information processing apparatus.

This application describes a technology for enhancing the enjoyment of exchange of communication data between information processing apparatuses.

A computer-readable storage medium of an example embodiment has stored therein an information processing program, and this information processing program causes a computer of a first information processing apparatus to function as a communication unit for receiving communication history data indicating a history, of a second information processing apparatus, of communication of predetermined communication data performed with an information processing apparatus other than the second information processing apparatus using wireless communication from the second information processing apparatus using wireless communication, and an information processing unit for performing predetermined information processing with the communication history data received by the communication unit as a parameter. According to this configuration, the first information processing apparatus performs predetermined information processing with the communication history data of the second information processing apparatus which is a communication counterpart as a parameter, and thus, the enjoyment of exchange of communication data may be enhanced.

The communication history data may be data indicating a history, of the second information processing apparatus, of reception of the communication data. According to this configuration, the first information processing apparatus may perform predetermined information processing with the history, of the second information processing apparatus, of reception of communication data from another information processing apparatus as a parameter.

The communication history data may be data indicating the number of counterparts of the communication. According to this configuration, the first information processing apparatus may perform predetermined information processing based on from how many other information processing apparatuses the second information processing apparatus has received communication data, and the number of counterparts from which the communication data has been received may be shown to others, and thus, the enjoyment of exchange of communication data may be enhanced.

The information processing unit may perform, using first data that can be used by a first application program and the communication history data received by the communication unit, predetermined information processing of the first application program. According to this configuration, the communication history data received from a communication counterpart may be used by the first application.

The communication unit may further receive first data that can be used by a first application program from the second information processing apparatus, and the information processing unit may perform, using the first data that is stored in the first information processing apparatus and that can be used by the first application program, the first data received by the communication unit, and the communication history data received by the communication unit, predetermined information processing of the first application program. According to this configuration, data that can be used by the first application may be exchanged, and also, the received communication history data may be used by the first application.

The information processing unit may update the first data stored in the first information processing apparatus by the communication history data, as the information processing.

The information processing unit may execute a game that takes the communication history data as a parameter, as the information processing. According to this configuration, a game may be executed using the communication history data.

The communication unit may receive, using wireless communication, the communication data from the second information processing apparatus together with the communication history data, and the information processing unit may perform, using the communication data, information processing different from the predetermined information processing. According to this configuration, information processing (for example, a game) may be performed using the communication data received from another information processing apparatus.

An information processing program of another example embodiment is an information processing program for causing a computer of a first information processing apparatus for performing wireless communication with a second information processing apparatus including a data storage unit, a communication unit and an information processing unit to function as the data storage unit, the communication unit and the information processing unit, wherein the data storage unit stores communication history data indicating a history of wireless communication of predetermined communication data performed by the communication unit with another information processing apparatus, wherein the communication unit transmits/receives the communication history data to/from another information processing apparatus using wireless communication, and wherein the information processing unit performs predetermined information processing with the communication history data received by the communication unit as a parameter. Also according to this configuration, the first information processing apparatus performs predetermined information processing with the communication history data of the second information processing apparatus which is a communication counterpart as a parameter, and thus, the enjoyment of exchange of communication data may be enhanced.

An information processing apparatus of an example embodiment includes a communication unit for receiving communication history data indicating a history, of another information processing apparatus, of wireless communication of predetermined communication data performed with an information processing apparatus other than the other information processing apparatus from the other information processing apparatus using wireless communication, and an information processing unit for performing predetermined information processing with the communication history data received by the communication unit as a parameter. Also according to this configuration, predetermined information processing is performed with the communication history data of another information processing apparatus which is a communication counterpart as a parameter, and thus, the enjoyment of exchange of communication data may be enhanced.

An information processing system of an example embodiment is an information processing system including a plurality of information processing apparatuses, wherein the plurality of information processing apparatuses each include a data storage unit, a communication unit and an information processing unit, wherein the data storage unit stores communication history data indicating a history of wireless communication of predetermined communication data performed by the communication unit with another information processing apparatus, wherein the communication unit transmits/receives the communication history data to/from another information processing apparatus using wireless communication, and wherein the information processing unit performs predetermined information processing with the communication history data of another information processing apparatus received by the communication unit as a parameter. Also according to this configuration, the first information processing apparatus performs predetermined information processing with the communication history data of the second information processing apparatus which is a communication counterpart as a parameter, and thus, the enjoyment of exchange of communication data may be enhanced.

An information processing method of an example embodiment is an information processing method of an information processing apparatus, the method including receiving communication history data indicating a history, of another information processing apparatus, of wireless communication of predetermined communication data performed with an information processing apparatus other than the other information processing apparatus from the other information processing apparatus using wireless communication, and performing predetermined information processing with the communication history data which has been received as a parameter. Also according to this configuration, predetermined information processing is performed with the communication history data of another information processing apparatus which is a communication counterpart as a parameter, and thus, the enjoyment of exchange of communication data may be enhanced.

These and other object, features, aspects and advantages of the technology will become more apparent from the following detailed description of non-limiting example embodiments when taken in conjunction with the accompanying drawings.

DETAILED DESCRIPTION OF NON-LIMITING EXAMPLE EMBODIMENTS

Hereinafter, non-limiting example embodiments will be described with reference to the drawings. The non-limiting example embodiments described below are examples for carrying out the technology, and do not restrict the technology to the concrete configurations described below. When carrying out the technology, a concrete configuration according to an embodiment may be applied as appropriate.

Figure 1:
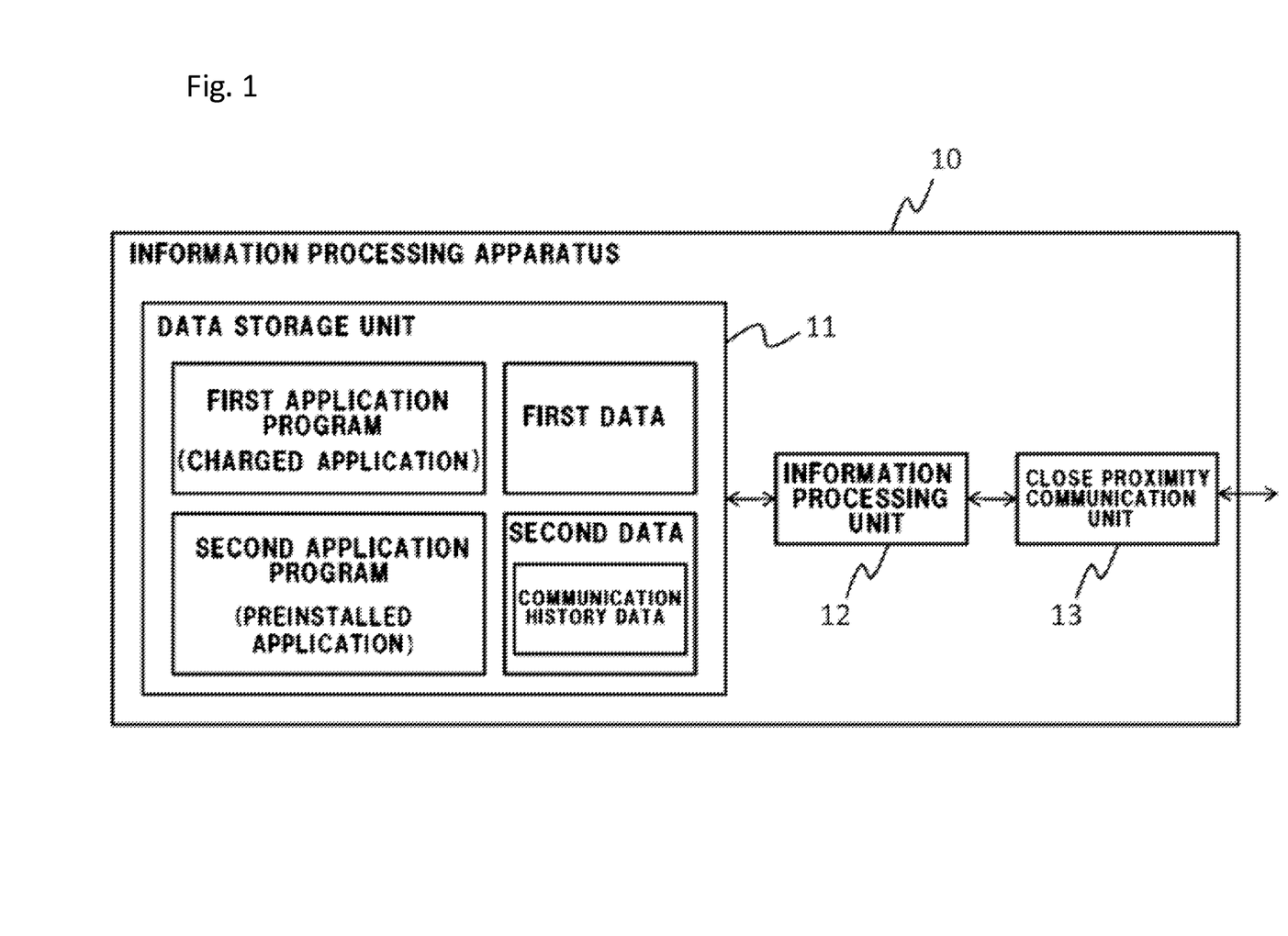
FIG. 1 shows an example non-limiting block diagram showing a main configuration of an information processing apparatus.

FIG. 1 shows an example non-limiting block diagram showing a main configuration of an information processing apparatus. An information processing apparatus of a present embodiment is a portable game device having a wireless communication function, but the product forms may be other forms, such as a smartphone, a tablet PC and the like. An information processing apparatus 10 includes, as its main components, a data storage unit 11, an information processing unit 12, and a close proximity communication unit 13. In the example in FIG. 1, the data storage unit 11, the information processing unit 12, and the close proximity communication unit 13 are integrally formed as the information processing apparatus 10, but these components may be arranged being scattered over a plurality of devices. For example, the information processing apparatus 10 may include the data storage unit 11 and the information processing unit 12, and the close proximity communication unit 13 may be a communication terminal that is externally attached to the information processing apparatus 10.

A computer that is not shown is embedded in the information processing apparatus 10, and the functions of the data storage unit 11, the information processing unit 12, and the close proximity communication unit 13 described below are realized by the computer executing predetermined information processing programs. The information processing programs may be installed on the information processing apparatus 10 by being read out from a computer-readable storage medium, or may be installed on the information processing apparatus 10 by being downloaded by the information processing apparatus 10 over a network.

The data storage unit 11 stores a first application program, first application data that can be used by the first application program (hereinafter, simply referred to as "first data"), a second application program, and second application data that can be used by the second application program (hereinafter, simply referred to as "second data"), and also stores communication history data as a part of the second data. The data storage unit 11 storing the first application program functions as a first application storage unit, the data storage unit 11 storing the first data functions as a first data storage unit, the data storage unit 11 storing the second application program functions as a second application storage unit, the data storage unit 11 storing the second data functions as a second data storage unit, and the data storage unit 11 storing the communication history data functions as a communication history data storage unit. Typically, the data storage unit 11 of the present embodiment is configured from a flash memory, but this is not restrictive, and the data storage unit 11 may be other storage medium such as a hard disk.

In the present embodiment, the first application program is a program that is installed on the information processing apparatus 10 according to an operation of a user and that is stored in the data storage unit 11, and the second application program is preinstalled on the information processing apparatus 10, and is stored in the data storage unit 11 before shipping, for example. Also, the first application program is a program that is provided for a charge, and that is installed on the information processing apparatus 10 when a user pays the charge. The second application program is a program that is provided free of charge, and that is installed in advance on the information processing apparatus 10 without a user paying the charge.

The first application program may be installed on the information processing apparatus 10 by the information processing apparatus 10 connecting to the Internet via a wireless communication unit, not shown, or the close proximity communication unit 13 and downloading the program over the Internet. Also, the first application program may be installed on the information processing apparatus 10 by the information processing apparatus 10 reading out the program from a portable storage medium.

Additionally, the first application program and the second application program may be charged or free of charge. Also, the first application program and the second application program may be installed according to an operation of a user, or may be preinstalled. However, with respect to the first application program, the present embodiment assumes that there are the information processing apparatus 10 on which the program is installed and the information processing apparatus 10 on which the program is not installed. That is, the first application program may be sold by being preinstalled on the information processing apparatus 10, but in this case, the information processing apparatus 10 on which the first application program is not preinstalled is also sold. As described above, in the present embodiment, the first application program is provided for a charge, and the second application program is a program that is installed in advance on the information processing apparatus 10, and thus, in the following, the first application program will be referred to as a "charged application" and the second application program will be referred to as a "preinstalled application".

The data storage unit 11 stores at least one of the first data that can be used by the charged application and the second data that can be used by the preinstalled application, based on the premise as described above that there is the information processing apparatus 10 on which the charged application is installed and there is the information processing apparatus 10 on which the charged application is not installed.

The first data is generated and used by the charged application. The second data is generated and used by the preinstalled application. Also, the first data and the second data are updated based on processing results of the charged application and the preinstalled application, respectively. Additionally, in the case where the charged application is not installed (i.e. not stored in the data storage unit 11), the first data is also not stored in the data storage unit 11. Also, even if the charged application is installed, if the charged application is not being executed, the first data is not generated, and the first data is possibly not stored in the data storage unit 11. The same applies to the second data, and in the case where generation of the second data by the execution of the preinstalled application is not performed, the second data is possibly not stored in the data storage unit 11.

The information processing unit 12 executes the charged application according to an operation of a user in the case where the charged application is stored in the data storage unit 11. Moreover, the information processing unit 12 executes the preinstalled application according to an operation of a user.

In the present embodiment, the charged application is a program of a fighting game. In the present embodiment the fighting game is a war game where armies formed of a plurality of soldiers fight against each other, and the first data includes data indicating the number of soldiers in own army at the time of playing the war game. In the war game of the charged application, the greater the number of soldiers, the more advantageous in a battle. Therefore, the first data is data that influences the progress of a game in the war game, and is data that is a parameter advantageous for a battle in the war game. Specifically, the greater the number indicated by the first data, the more advantageous to a user in the war game. The fighting game is not limited to a war game but may also be a beat'-em-up game, a competition game, or other kind of games in which a player tries conclusions with opponents.

In the war game, when own army wins, the number of soldiers in own army is increased by a predetermined number, and when an enemy army wins, the number of soldiers in own army is decreased by a predetermined number. That is, the first data is updated according to a processing result of the charged application. Additionally, the number of soldiers in own army that increases when own army wins may be determined according to the number of soldiers in the enemy army. For example, when own army wins, the number of soldiers in the enemy army may be added to the number of soldiers in own army.

The preinstalled application is a program of an interactive game where an avatar of a user is created and made to interact with an avatar of another user. The second data includes interaction information data and communication history data. The interaction information data includes data such as the avatar of a user, a name, a favorite animal or a message associated with the avatar, and the like.

The communication history data is data indicating the number of other information processing apparatuses 10 (the number of communication counterparts) with which the second data has been exchanged by close proximity communication. Additionally, as will be described later, in the case where the avatar is not created and stored at the information processing apparatus 10, the second data is received from the information processing apparatus 10 which is a communication counterpart in a one-sided manner, but the reception in this case may also be counted in the communication history. That is, the communication history data may be at least the number of counterparts from which the second data has been received. The communication history data may include, instead of or together with the number of communication counterparts, data regarding the number of times close proximity communication has been performed, the place where close proximity communication has been performed, and/or the time of performance of close proximity communication. Also, the communication history data is not restricted to data indicating the history of communication of data that is used by an application, and it may also be data indicating the history of communication of other arbitrary data.

The information processing apparatus 10 repeatedly searches for another information processing apparatus 10 in the communication range of close proximity wireless communication, automatically wirelessly connects to the other information processing apparatus 10 which has been detected, and automatically transmits/receives data to/from the other information processing apparatus 10 to which the information processing apparatus 10 has wirelessly connected. In the present embodiment, the close proximity communication unit 13 performs close proximity communication with another information processing apparatus 10. Additionally, in the present application, the "close proximity communication" refers to communication performed between the information processing apparatuses 10 that are physically close to each other, and typically includes wireless communication which is performed by the information processing apparatuses 10 connected in an ad-hoc manner without using some kinds of base station (or an access point or a master device), but is not limited to this. For example, wireless communication adopting Bluetooth (registered trademark) or infrared communication is also allowed, or communication where the information processing apparatuses 10 are directly connected in a wired manner is also allowed. In the present embodiment, the close proximity communication unit 13 particularly exchanges the first data and the second data including the communication history data with another information processing apparatus 10 existing in close proximity.

In this manner, the close proximity communication unit 13 connects to another information processing apparatus 10 existing in close proximity in an ad-hoc manner and performs wireless communication, and thus, transmission/reception of data may be performed with an unspecific information processing apparatus 10. For example, if a plurality of unspecific users each possess the information processing apparatus 10 and leave the function of the close proximity communication unit 13 activated, wireless communication is performed when the users pass each other by in a public space, and the first data and the second data (including the communication history data) are exchanged.

(Data Exchange)

When close proximity communication is established with another information processing apparatus 10 existing in close proximity, the close proximity communication unit 13 performs data exchange with the other information processing apparatus 10. In the present embodiment, the preinstalled application is installed on every information processing apparatus 10, and the second data is exchanged at the time of the close proximity communication. Additionally, in the case where the second data is not stored in the data storage unit 11, the information processing apparatus 10 does not receive the second data from the other information processing apparatus 10, and does not transmit the second data to the other information processing apparatus 10. As an example modification, it is also possible to allow, in the case where the second data is not stored in the data storage unit 11, the information processing apparatus 10 to only receive the second data from the other information processing apparatus 10, and not to transmit the second data to the other information processing apparatus 10.

As described above, the communication history data is data indicating the number of counterparts with which the second data has been exchanged (or simply received therefrom) in the past. The second data to be exchanged also includes this communication history data. Accordingly, the information processing apparatus 10 transmits data (the communication history data) indicating the number of counterparts from which the information processing apparatus 10 has received the second data in the past, to the information processing apparatus 10 which is the communication counterpart, and at the same time, receives, from the information processing apparatus 10 which is the communication counterpart, data (the communication history data) indicating the number of counterparts from which its user has received the second data in the past.

Furthermore, the information processing apparatus 10 on which the charged application is installed transmits its first data to the information processing apparatus 10 which is a communication counterpart in the case where the same charged application is installed on the information processing apparatus 10 which is the communication counterpart. Since the information processing apparatus 10 which is the communication counterpart performs the same process, the first data of the information processing apparatus 10 which is the communication counterpart is transmitted from this information processing apparatus 10 to the information processing apparatus on which the charged application is installed. The information processing apparatus 10 on which the charged application is installed receives the first data of the information processing apparatus 10 which is the communication counterpart.

The information processing apparatus 10 on which the charged application is installed notifies, when close proximity communication is established with another information processing apparatus 10, the information processing apparatus 10 which is the communication counterpart of application information indicating that the charged application is installed (or simply identification information for identifying the charged application), to notify the information processing apparatus 10 which is the communication counterpart that the charged application is installed. Since the information processing apparatus 10 which is the communication counterpart performs the same process, the application information indicating that the charged application is installed on this information processing apparatus 10 is transmitted also from the information processing apparatus 10 which is the communication counterpart.

The information processing apparatus 10 on which the charged application is installed perceives that the charged application is installed on the information processing apparatus 10 which is the communication counterpart by receiving this application information, and transmits its first data to the information processing apparatus 10 which is the communication counterpart. Additionally, the information processing apparatus 10 on which the charged application is not installed does not transmit the first data even if the application information indicating that the charged application is installed is received, because there is no first data to be transmitted in response. Moreover, the application information may be transmitted being included in a beacon for establishing close proximity communication instead of being transmitted/received after the close proximity communication is established.

Figure 2:
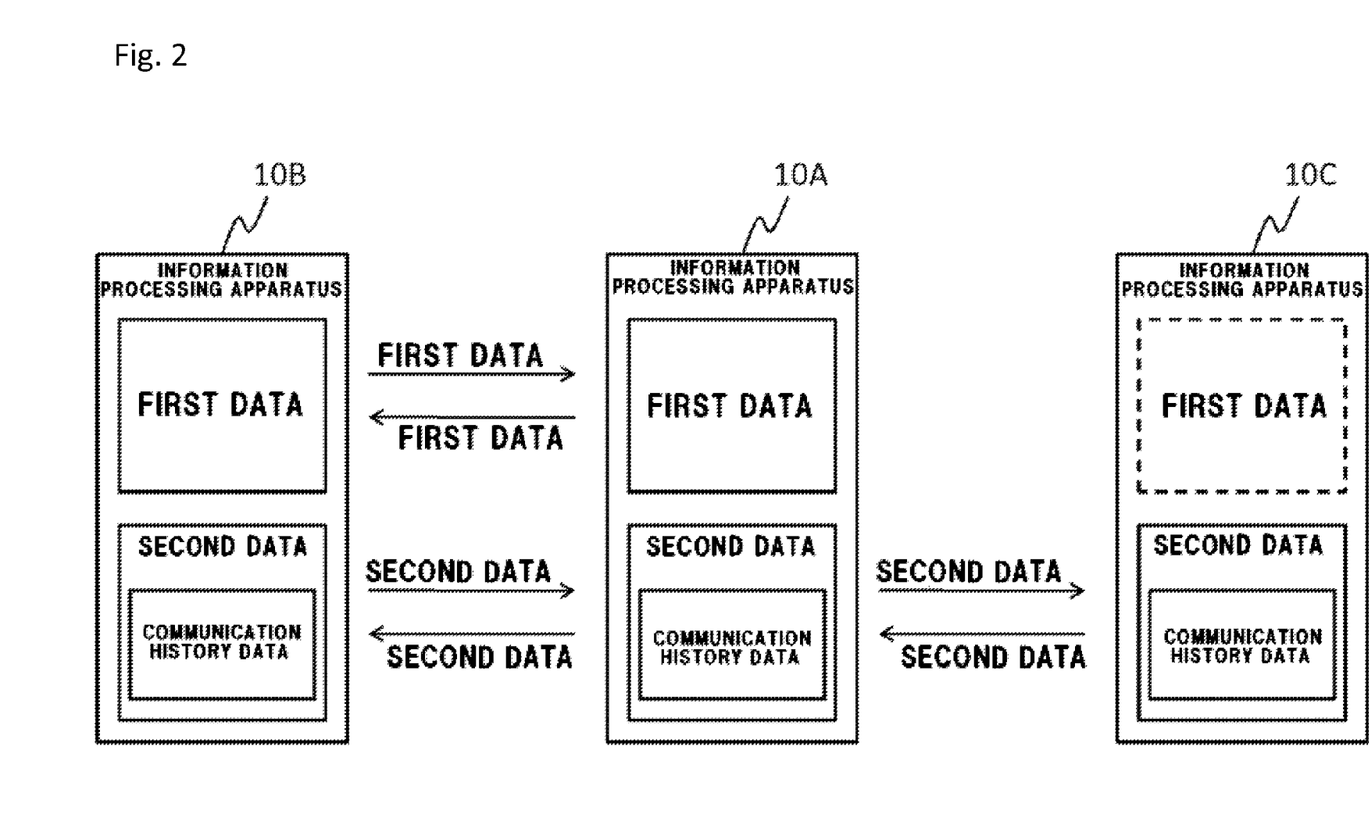
FIG. 2 shows an example non-limiting diagram for describing data exchange in close proximity communication between information processing apparatuses.

FIG. 2 is a diagram for describing data exchange in close proximity communication between the information processing apparatuses 10. Information processing apparatuses 10A, 10B and 10C are shown in FIG. 2. The first data and the second data including the communication history data are stored in the information processing apparatus 10A and the information processing apparatus 10B. The charged application is not installed on the information processing apparatus 10C, and the first data is not stored therein, but the preinstalled application is installed thereon, and the second data including the communication history data is stored therein.

Both the information processing apparatus 10A and the information processing apparatus 10B possess the first data, and thus, perform exchange of not only the second data, but also of the first data. The information processing apparatus 10A possesses the first data, but the information processing apparatus 10C does not possess the first data, and thus, the first data is not transmitted from the information processing apparatus 10A to the information processing apparatus 10C. However, the second data is exchanged also between the information processing apparatus 10A and the information processing apparatus 10C.

Next, a method of using the data received by the data exchange in the above manner will be described. In the following, an example will be described where the information processing apparatus 10A (own device) receives data by close proximity communication from each of the information processing apparatus 10B and the information processing apparatus 10C (other devices).

(Use of Received Data: Interaction Information Data)

Figure 3:
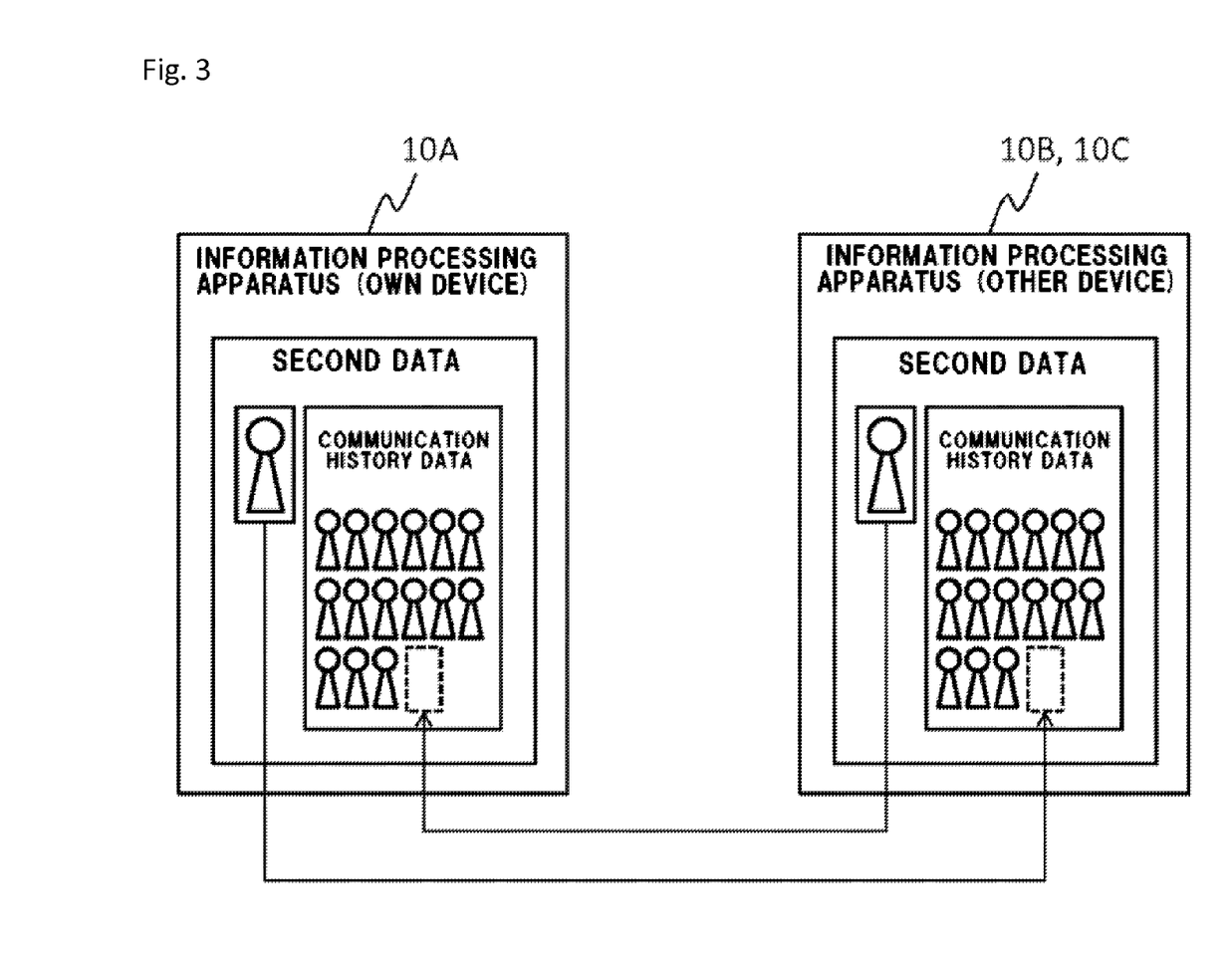
FIG. 3 shows an example non-limiting diagram for describing a method of using received interaction information data.

FIG. 3 is a diagram for describing a method of using interaction information data received from another information processing apparatus 10. As described above, the information processing apparatuses 10A, 10B and 10C all possess the second data, and thus, as shown in FIG. 3, the second data is exchanged between the information processing apparatus 10A and the information processing apparatuses 10B and 10C. Outlined human figures shown in FIG. 3 indicate avatars as the interaction information data, and a large human figure indicates the avatar of the own device, and a small human figure indicates the avatar of another device. The number of avatars of other devices is the number of information processing apparatuses which were communication counterparts, and corresponds to the communication history data.

The information processing apparatus 10A (the own device) transmits the interaction information data including its avatar to the information processing apparatuses 10B and 10C which are communication counterparts (other devices), and receives the interaction information data from each of the information processing apparatuses 10B and 10C. When the interaction information data of another device is received, the information processing unit 12 of the information processing apparatus 10A stores that same in the data storage unit 11, and updates the communication history data.

Specifically, in the case where the interaction information data is received, the information processing unit 12 of the information processing apparatus 10A recounts the number of all the pieces of interaction information data received in the past including this interaction information data, and updates the communication history data. Or, in the case where the interaction information data is received, the information processing unit 12 of the information processing apparatus 10A increments the number indicated by the communication history data if the interaction information data of the information processing apparatus which is the communication counterpart is not stored in the data storage unit 11. Additionally, when exchange of the interaction information data is performed between the information processing apparatus 10A and the information processing apparatuses 10B and 10C, the same process is performed by the information processing apparatuses 10B and 10C as by the information processing apparatus 10A.

(Use of Received Data: First Data)

Figure 4:
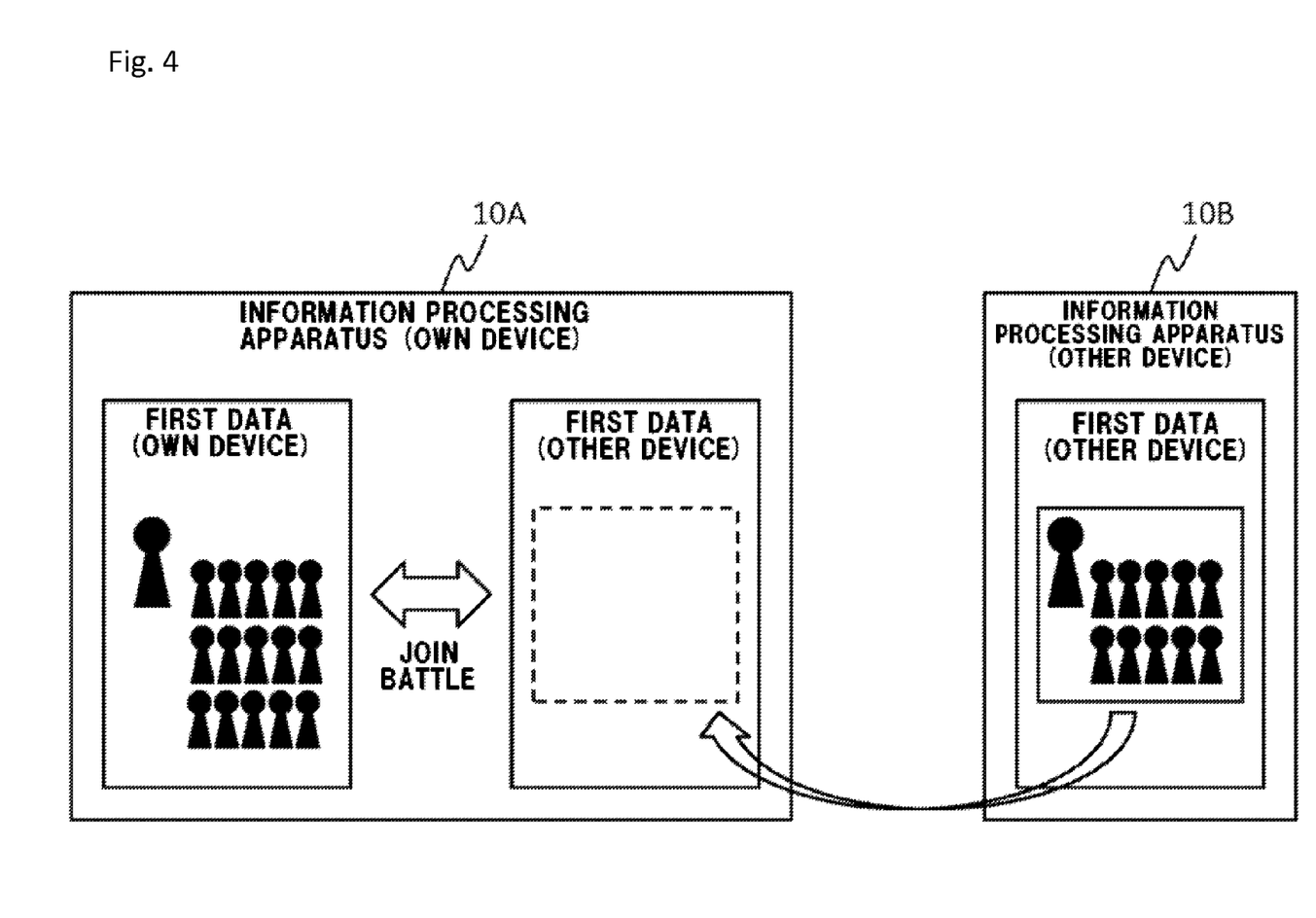
FIG. 4 shows an example non-limiting diagram for describing a method of using received first data.

FIG. 4 is a diagram for describing a method of using the first data received from another information processing apparatus 10. When the first data is received from the information processing apparatus 10B (another device), the information processing apparatus 10A (own device) uses the received first data as a parameter of an opponent in the charged application which is a war game. Black human figures in FIG. 4 indicate soldiers in the war game. The number of soldiers in own army in the war game where soldiers fight one another is stored as the first data in the information processing apparatus 10A, and when the first data is received from the information processing apparatus 10B, this is stored as the data regarding the number of soldiers of the opponent.

When the charged application is executed by the information processing unit 12 of the information processing apparatus 10A after the first data has been received from the information processing apparatus 10B, the information processing unit 12 takes the number indicated by the first data of the own device as the parameter (the number of soldiers) of own army and the number indicated by the first data of the other device which has been received as the parameter (the number of soldiers) of the enemy army, and performs the war game. Although the winning or losing does not depend entirely on the number of soldiers, the war game progresses more advantageously as the number of soldiers in own army is greater, and less advantageously as the number of soldiers in the enemy army is greater. Additionally, when the first data is exchanged between the information processing apparatus 10A and the information processing apparatus 10B, the same process is performed by the information processing apparatus 10B as by the information processing apparatus 10A.

(Use of Received Data: Communication History Data)

Figure 5:
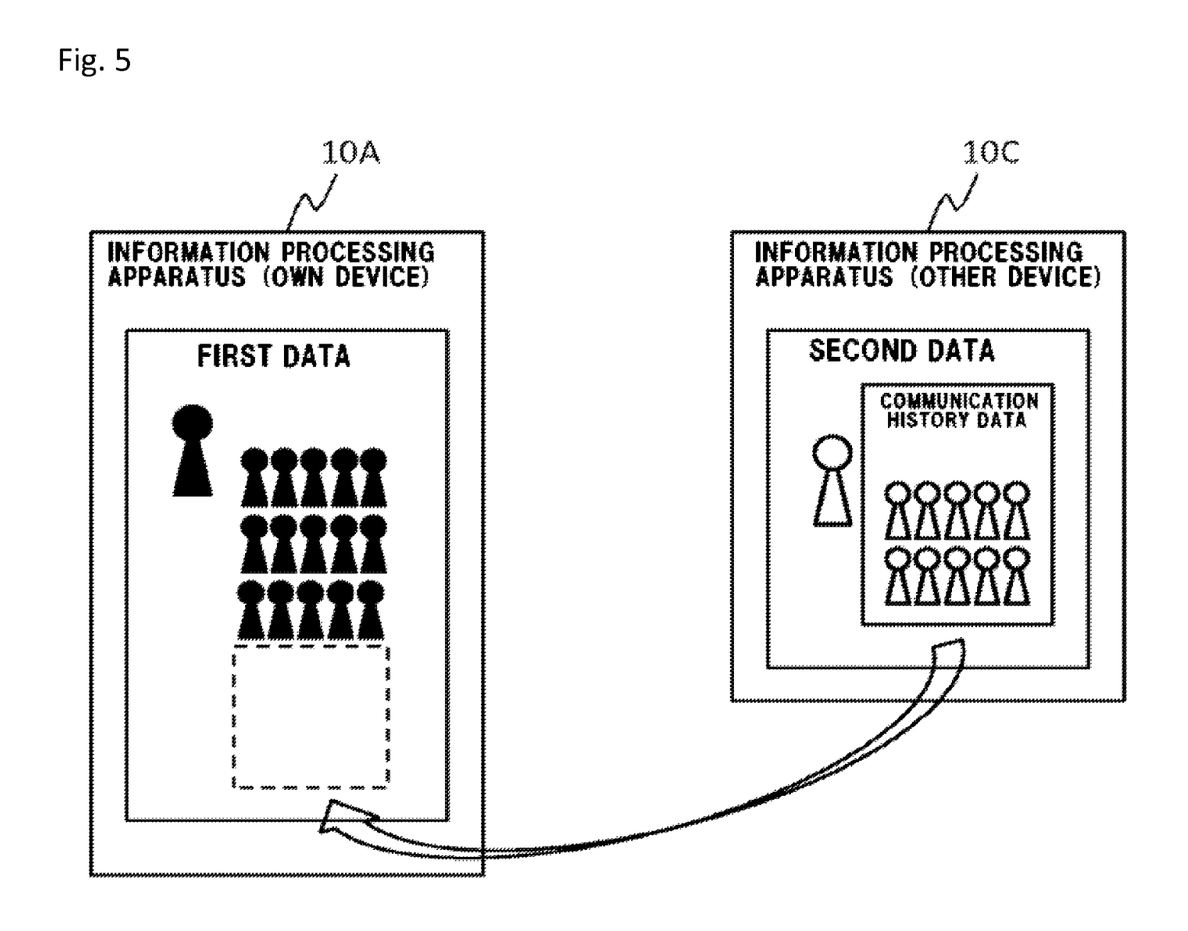
FIG. 5 shows an example non-limiting diagram for describing a method of using received communication history data.

FIG. 5 is a diagram for describing a method of using the communication history data received from another information processing apparatus 10. Whereas the information processing apparatus 10A has the charged application installed thereon and possesses the first data, the information processing apparatus 10C does not have the charged application installed thereon and does not possess the first data, and thus, when close proximity communication is established between the information processing apparatus 10A and the information processing apparatus 10C, only the second data is exchanged between the two.

At this time, the information processing unit 12 of the information processing apparatus 10A on which the charged application is installed performs information processing with the communication history data received from the information processing apparatus 10C on which the charged application is not installed as a parameter. Specifically, the information processing unit 12 of the information processing apparatus 10A updates the first data with the received communication history data as a parameter. As described above, the communication history data received from the information processing apparatus 10C is data about the number of counterparts with which the information processing apparatus 10C has performed close proximity communication in the past, and the first data of the information processing apparatus 10A is the number of soldiers of own army at the time of playing the war game. The information processing unit 12 of the information processing apparatus 10A updates the first data by adding the number indicated by the received communication history data to the number of soldiers indicated by the first data.

As described above, the first data (the number of soldiers) is to be updated according to the processing result of the charged application (the result of the war game), and the information processing apparatus 10A updates the first data that is to be updated according to the processing result of the charged application using the number of counterparts of past close proximity communication of the information processing apparatus 10C, regardless of the processing result of the charged application.

Moreover, as an example modification, in the case where data exchange is performed with the information processing apparatus 10C on which the charged application is not installed and the communication history data is received as a part of the second data from the information processing apparatus 10C, the information processing unit 12 of the information processing apparatus 10A on which the charged application is installed may update the first data regardless of the communication history data. The information processing unit 12 of the information processing apparatus 10A may update the first data by adding a fixed value or by adding a random value every time close proximity communication with an information processing apparatus on which the charged application is not installed is performed, for example.

Also, as another example modification, in the case where data exchange is performed with the information processing apparatus 10C on which the charged application is not installed and the communication history data is received as a part of the second data from the information processing apparatus 10C, the information processing unit 12 of the information processing apparatus 10A on which the charged application is installed may update, using the communication history data, some kinds of data, other than the first data, that is to be used by the charged application.

Also, as further another example modification, in the case where data exchange is performed with the information processing apparatus 10C on which the charged application is not installed and the communication history data is received as a part of the second data from the information processing apparatus 10C, the information processing unit 12 of the information processing apparatus 10A on which the charged application is installed may perform information processing other than the update of data, using the communication history data as a parameter. For example, the information processing unit 12 may, in the case where data is exchanged with another information processing apparatus that possesses the first data, execute the war game with the received first data as the parameter regarding the enemy army as described above, and may, in the case where only the second data is exchanged with another information processing apparatus that does not possess the first data, perform information processing such as determination of a background of the war game based on the communication history data. Also, the information processing unit 12 may perform, as predetermined information processing, arithmetic calculation with the received communication history data as a parameter, or may process some kind of data using the received communication history data as a parameter. Incidentally, information processing of simply displaying the communication history data does not correspond to the information processing that is performed with the communication history data as a parameter.

(Flow of Data Exchange Process)

Figure 6:
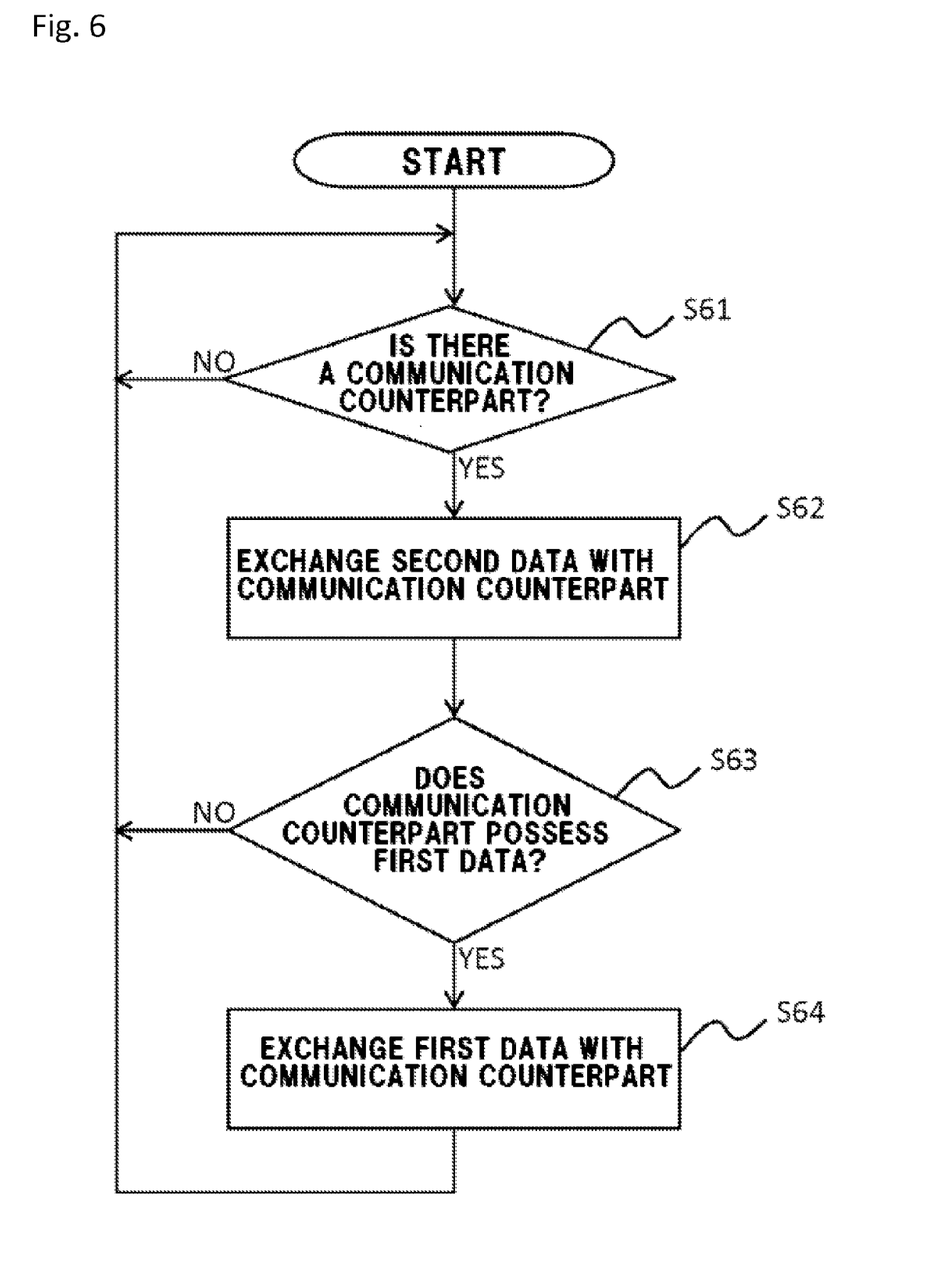
FIG. 6 shows an example non-limiting flow chart of a data exchange process.

FIG. 6 is a flow chart of a data exchange process. When the close proximity communication unit 13 is active, the information processing apparatus 10 performs transmission/reception of beacons and searches for a communication counterpart of close proximity wireless communication (step S61). The information processing apparatus 10 continues to search for a communication counterpart (step S61: NO) until the close proximity communication function of the close proximity communication unit 13 is turned off or a communication counterpart is found. Additionally, at this time, the information processing apparatus 10 may be in a sleep state (or a standby state), or the search for a communication counterpart may be performed when a specific operation is performed by a user on the information processing apparatus 10.

When the information processing apparatus 10 receives a response from another information processing apparatus 10 with respect to a beacon it has transmitted, or when the information processing apparatus 10 receives a beacon from another information processing apparatus 10, the information processing apparatus 10 determines that there is a communication counterpart in close proximity (step S61: YES). When communication with the communication counterpart is established, exchange of the second data is performed (step S62).

Then, whether or not the communication counterpart possesses the first data is determined (step S63), and in the case where the communication counterpart does not possess the first data (step S63: NO), communication with the communication counterpart is ended, and the process returns to step S61 so as to search for another communication counterpart. In the case where the communication counterpart possesses the first data (step S63: YES), the first data is exchanged with the communication counterpart (step S64).

(Flow of Process based on Received Data)

Figure 7:
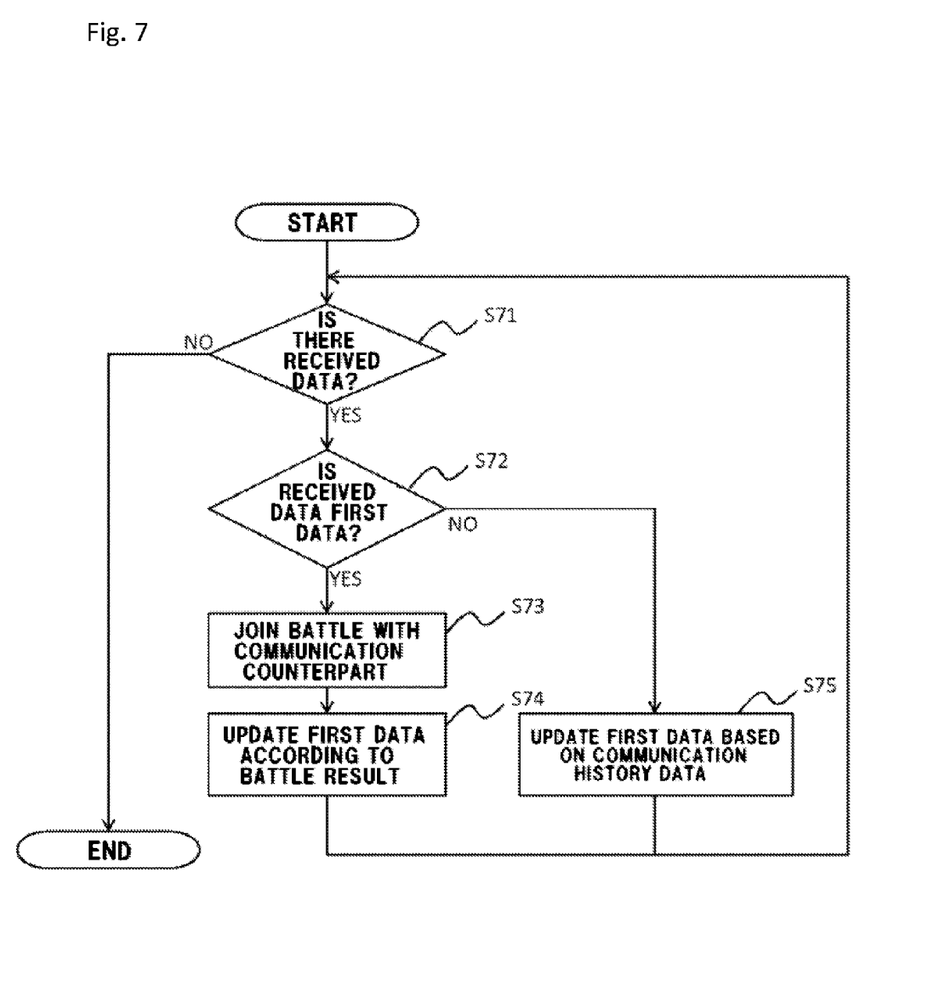
FIG. 7 shows an example non-limiting flow chart of a process based on received data.

FIG. 7 is a flow chart of a process based on received data. This process flow is performed after the data exchange process described above is performed. Typically, a user goes out carrying the information processing apparatus 10 in a sleep state, and the above-described data exchange process is performed while the user is out, and then, when the user returns home, operates the information processing apparatus 10 and executes the charged application, the process shown in FIG. 7 is performed.

When the charged application is executed, the information processing unit 12 determines whether or not there is data that is newly received by close proximity wireless communication after the previous execution of the charged application (step S71). When there is no newly received data (step S71: NO), the process based on the received data is ended. When there is newly received data (step S71: YES), the information processing unit 12 determines whether or not the first received data that is not yet processed is the first data (step S72).

In the case where communication has been performed with a plurality of information processing apparatuses 10 before this process flow is started, there are a plurality of pieces of received data. Thus, the first received data that is not yet processed refers to the data which was received first among pieces of received data on which the process according to this flow is not performed. That is, at the time of execution of the charged application, if a plurality of pieces of data have been received by close proximity wireless communication after the previous execution of the charged application, the information processing unit 12 performs the following information processing based on the received data according to the order of reception.

In the case where the received data is the first data (step S72: YES), the war game is executed with the communication counterpart which has transmitted the first data as the opponent (step S73). Here, the war game that takes the communication counterpart as the opponent is not executed by actually communicating with the opponent at the time of execution, but is executed by determining the parameter of the opponent based on the first data transmitted from the communication counterpart. Specifically, the number of soldiers of the opponent (the enemy army) is determined based on the first data transmitted from the communication counterpart.

When the war game is over, the first data of the own device is updated according to the battle result (step S74). Also, in the case where the first received data that is not yet processed is not the first data (step S72: NO), the first data is updated based on the communication history data received as the second data (step S75). When the first data is updated in step S74 or step S75, the process returns to step S71, and whether or not there is still received data that is not yet processed is determined.

In this manner, at the time of execution of the charged application, in the case where the first data is received from a certain information processing apparatus by close proximity wireless communication after the previous execution of the charged application, and then, only the second data is received from another information processing apparatus, the information processing unit 12 first executes the information processing described above based on the received first data and updates the first data based on the result, and then, further updates the first data using the second data received from the other information processing apparatus.

On the other hand, in the case where only the second data is received from a certain information processing apparatus after the previous execution of the charged application, and then, the first data is received from another information processing apparatus by close proximity wireless communication, the information processing unit 12 first updates, at the time of execution of the charged application, the first data using the second data received from the certain information processing apparatus, and then, performs the information processing described above based on the updated first data and the received first data.

In this manner, at the time of activating a war game which is the charged application, in the case where a plurality of pieces of data have been received after the previous activation, the information processing unit 12 executes the war game based on the received data according to the order of reception, and also, performs a different process depending on whether only the second data is received or the first data is received, and for example, if pieces of data are received in the order of only the second data, only the second data, only the second data, and then, the first data, first, own army may be reinforced by these pieces of second data before going into battle against the enemy army based on the first data received at the end, but if the pieces of data are received in the order of the first data, only the second data, only the second data, and then, only the second data, for example, reinforcement of own army by these pieces of second data is not reflected at the time of going into battle against the enemy army based on the first data that is received first. In the case where close proximity communication is performed and data is exchanged at the time of passing by in a public space, with which information processing apparatuses 10 and in what order the data will be exchanged is not according to the intention of a user and is a matter of chance. The present embodiment can enhance the enjoyment of the information processing (a war game) based on data exchange and received data also because the chance factor affects the advantage/disadvantage in a game.

As described above, according to the information processing apparatus 10, close proximity communication is performed with another information processing apparatus 10, and the interaction information data including data such as an avatar is exchanged. The information processing apparatus 10 stores the number of pieces of interaction information data received from other information processing apparatuses 10, that is, the number of information processing apparatuses 10 with which close proximity communication was performed and data was exchanged, as the communication history data. The information processing apparatus 10 also exchanges this communication history data at the time of exchanging the interaction information data. The information processing unit 12 of the information processing apparatus 10 performs predetermined information processing with the communication history data received from another information processing apparatus 10 as a parameter. Thus, the enjoyment of communication data exchange is enhanced because, in the data exchange by close proximity communication, not only the interaction information data of the counterpart of the close proximity communication is acquired, but also, the communication history data indicating with how many other information processing apparatuses 10 the communication counterpart has exchanged the interaction information data in the past is acquired, and the information processing is performed with the communication history data as a parameter.

Also, according to the information processing apparatus 10, close proximity communication is performed with another information processing apparatus 10, and in the case where both the own device and the information processing apparatus which is a communication counterpart (other device) possess the first data that can be used by the charged application in addition to the second data that can be used by the preinstalled application, the first data is exchanged together with the second data, and in the case where the own device possesses the first data in addition to the second data, but another device possesses only the second data and not the first data, the own device updates the first data using the second data received from the other device, and the first data can be updated based on the second data received from the other device even if the charged application is installed on the own device but not on the other device which is a communication counterpart, and thus, the enjoyment of exchange of communication data can be enhanced for the own device on which the charged application is installed.

Particularly, since the charged application of the present embodiment is a program of a war game, a mechanism is provided where, in the case where the war game is installed on the own device, if the war game is also installed on another device which is a communication counterpart, the other device is made an enemy in the war game by the first data being received from the other device, and if the war game is not installed on the other device, the other device is made an ally by the second data (the communication history data) being received from the other device. Accordingly, the user of the information processing apparatus 10 on which the war game is installed may experience the fun of the war game by both the close proximity communication with another device on which the war game is installed and the close proximity communication with another device on which the war game is not installed.

Additionally, in embodiment described above, close proximity communication is cited as an example of the communication method used for data exchange, but other than this, communication between the information processing apparatuses 10 existing in close proximity to each other may be performed by the following method, for example. The information processing apparatus 10 may include a GPS (Global Positioning System), and the information processing apparatus 10 transmits, to a predetermined server, position information data acquired by the GPS, time information data regarding the acquisition of the position information data, and the data to be exchanged. The server determines and extracts an information processing apparatus 10 which has come within a predetermined distance at a certain period of time, using the position information data or the time information data transmitted from a plurality of information processing apparatuses 10. That is, the server determines, using the position information from the information processing apparatuses 10, whether each information processing apparatus 10 has come close (that is, whether it has "passed by"). Then, the server transmits the data to be exchanged to a corresponding information processing apparatus 10 so that the data to be exchanged is exchanged with the information processing apparatus 10 determined to have "passed by". Moreover, in this method, with respect to acquisition of the position information data, a current location may be calculated using measurement information (a MAC address or radio wave intensity) from other than the GPS, for example, from a wireless LAN access point, and this may be made the position information data.

While the technology has been described in detail, the foregoing description is in all aspects illustrative and not restrictive. It will be understood that numerous other modifications and variations can be devised.

What is claimed is:

1. A non-transitory computer-readable storage medium having stored therein an information processing program, wherein the information processing program, when executed by a computer of a first handheld information processing apparatus, causes the computer to:
   receive, by wireless communication from a second handheld information processing apparatus, communication history data indicating a history of communication of predetermined communication data performed using wireless communication between the second handheld information processing apparatus and one or more handheld information processing apparatuses;
   determine whether a first data different from the communication history data and indicating a result of executing a first application program on the second handheld information processing apparatus has been received;
   if the determining determined that the first data has not been received, perform a first information processing in the first application program; and
   if the determining determined that the first data has been received, perform a second information processing which is different from the first information processing,
   wherein the first information processing is a processing for updating a previously stored result of executing the first application program on the first handheld information processing apparatus based upon the received communication history data, and
   wherein the second information processing is a processing using the received first data and the previously stored result of executing the first application program on the first handheld information processing apparatus.

2. The non-transitory computer-readable storage medium according to claim 1, wherein the received communication history data includes data indicating a history, of the second handheld information processing apparatus, of reception of the predetermined communication data.

3. The non-transitory computer-readable storage medium according to claim 1, wherein the received communication history data includes data indicating the number of handheld information processing apparatuses with which the second handheld information processing apparatus performed said communication of predetermined communication data.

4. The non-transitory computer-readable storage medium according to claim 1, wherein the computer performs, using the first data that can be used by a first application program and the received communication history data, predetermined information processing of the first application program.

5. The non-transitory computer-readable storage medium according to claim 1,
   wherein the computer further receives the first data that can be used by a first application program from the second handheld information processing apparatus, and
   wherein the computer performs, using the first data that is stored in the first handheld information processing apparatus and that can be used by the first application program, the first data received by the computer, and the communication history data received by the computer, predetermined information processing of the first application program.

6. The non-transitory computer-readable storage medium according to claim 4, wherein the computer updates the first data stored in the first handheld information processing apparatus by the communication history data, as the predetermined information processing.

7. The non-transitory computer-readable storage medium according to claim 1, wherein the computer executes a game that takes the communication history data as a parameter, as the predetermined information processing.

8. The non-transitory computer-readable storage medium according to claim 1,
   wherein the computer receives, using wireless communication, the predetermined communication data from the second handheld information processing apparatus together with the communication history data, and performs, using the predetermined communication data, information processing different from the predetermined information processing.

9. A non-transitory computer-readable storage medium having stored therein an information processing program, wherein the information processing program, when executed by a computer of a first handheld information processing apparatus, causes the first handheld information processing apparatus to performs wireless communication with a second handheld information processing apparatus which includes a data storage, a communication interface, and at least one processor configured to:
   store, in the data storage, communication history data indicating a history of wireless communication of predetermined communication data performed using the communication interface with another handheld information processing apparatus;
   transmit/receive the communication history data to/from another handheld information processing apparatus using wireless communication;
   determine whether a first data different from the communication history data and indicating a result of executing a first application program on the second handheld information processing apparatus has been received;
   if the determining determined that the first data has not been received, perform a first information processing in the first application program; and if the determining determined that the first data has been received, perform a second information processing which is different from the first information processing, wherein the first information processing is a processing for updating a previously stored result of executing the first application program on the first handheld information processing apparatus based upon the received communication history data; and wherein the second information processing is a processing using the received first data and the previously stored result of executing the first application program on the first handheld information processing apparatus.

10. A handheld information processing apparatus comprising:

a communication interface configured to receive, by wireless communication with another handheld information processing apparatus, communication history data indicating a history of wireless communication of predetermined communication data performed between the another handheld information processing apparatus and one or more other handheld information processing apparatuses; and at least one processor configured to:

determine whether a first data different from the communication history data and indicating a result of executing a first application program on another handheld information processing apparatus has been received;

if the determining determined that the first data has not been received, perform a first information processing in the first application program; and if the determining determined that the first data has been received, perform a second information processing which is different from the first information processing, wherein the first information processing is a processing for updating a previously stored result of executing the first application program on the handheld information processing apparatus based upon the received communication history data;

wherein the second information processing is a processing using the received first data and the previously stored result of executing the first application program on the handheld information processing apparatus.

11. An information processing system including a first handheld information processing apparatus and a plurality of second handheld information processing apparatuses configured to communicate with each other, the first handheld information processing apparatus comprising:

a communication interface;

a data storage configured to store communication history data indicating a history of wireless communication of predetermined communication data performed using the communication interface with one of the second handheld information processing apparatuses; and at least one processor configured to:

determine whether a first data different from the communication history data and indicating a result of executing a first application program on said second handheld information processing apparatus has been received;

if the determining determined that the first data has not been received, perform a first information processing in the first application program; and if the determining determined that the first data has been received, perform a second information processing which is different from the first information processing, wherein the first information processing is a processing for updating a previously stored result of executing the first application program on the first handheld information processing apparatus based upon the received communication history data; and wherein the second information processing is a processing using the received first data and the previously stored result of executing the first application program on the first handheld information processing apparatus.

12. An information processing method of a first handheld information processing apparatus, the method comprising:

receiving, by wireless communication from a second handheld information processing apparatus, communication history data indicating a history of wireless communication of predetermined communication data performed using wireless communication between the second handheld information processing apparatus and one or more handheld information processing apparatuses;

determining whether a first data different from the communication history data and indicating a result of executing a first application program on the second handheld information processing apparatus has been received;

if the determining determined that the first data has not been received, perform a first information processing in the first application program; and if the determining determined that the first data has been received, perform a second information processing which is different from the first information processing, wherein the first information processing is a processing for updating a previously stored result of executing the first application program on the first handheld information processing apparatus based upon the received communication history data; and wherein the second information processing is a processing using the received first data and the previously stored result of executing the first application program on the first handheld information processing apparatus.

* * * * *